(12) United States Patent
Jagannathan et al.

(10) Patent No.: US 11,208,883 B2
(45) Date of Patent: Dec. 28, 2021

(54) PIPELINE DEPOSITION IMAGING

(71) Applicant: Halliburton Energy Services, Inc., Houston, TX (US)

(72) Inventors: Srinivasan Jagannathan, Houston, TX (US); David B. Bennett, Conroe, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 214 days.

(21) Appl. No.: 16/463,524

(22) PCT Filed: Jun. 22, 2018

(86) PCT No.: PCT/US2018/039021
§ 371 (c)(1),
(2) Date: May 23, 2019

(87) PCT Pub. No.: WO2019/245583
PCT Pub. Date: Dec. 26, 2019

(65) Prior Publication Data
US 2021/0108504 A1    Apr. 15, 2021

(51) Int. Cl.
*E21B 47/00* (2012.01)
*E21B 47/002* (2012.01)
(Continued)

(52) U.S. Cl.
CPC ........ *E21B 47/006* (2020.05); *E21B 47/0025* (2020.05); *G01N 29/14* (2013.01);
(Continued)

(58) Field of Classification Search
CPC .... E21B 47/006; E21B 47/0025; E21B 47/14; G01N 29/14; G01N 29/44; G01N 2291/02854; G01N 2291/628
(Continued)

(56) References Cited

U.S. PATENT DOCUMENTS

| 6,701,787 B2 | 3/2004 | Han et al. |
| 6,993,963 B1 | 2/2006 | Gudmundsson |

(Continued)

FOREIGN PATENT DOCUMENTS

| WO | 2017008098 A1 | 1/2017 |
| WO | 2017011850 A1 | 1/2017 |
| WO | 2017180131 | 10/2017 |

OTHER PUBLICATIONS

Zhigang, et al., Study on the Natural Gas Pipeline Safety Monitoring Technique and the Time-Frequency Signal Analysis Method. Journal of Loss Prevention in the Process Industries. Feb. 24, 2017. pp. 1-9. Elsevier, UK.

(Continued)

*Primary Examiner* — Tarun Sinha
(74) *Attorney, Agent, or Firm* — Thomas Rooney; C. Tumey Law Group PLLC

(57) ABSTRACT

The subject technology relates to a process by which data from two downhole loggers (e.g., acoustic transducers), one at each end of a pipeline, can be used to improve the resolution of a pressure pulse system, even for slow valve operating times. For example, the process of the subject technology uses data from two transducers (e.g., acoustic transducers), instead of one transducer typically employed in traditional approaches, thereby leading to increased resolution of the deposit location and thickness. By improving the deposition estimation resolution, locating smaller deposits in a pipeline more accurately can be realized. The improved resolution in deposition estimation computations supports better decision making by providing more detailed measurement and quantification data for use in resolution of deposition buildup.

19 Claims, 10 Drawing Sheets

(51) Int. Cl.
  *G01N 29/14* (2006.01)
  *G01N 29/44* (2006.01)
  *E21B 47/14* (2006.01)

(52) U.S. Cl.
  CPC .............. *G01N 29/44* (2013.01); *E21B 47/14* (2013.01); *G01N 2223/628* (2013.01); *G01N 2291/02854* (2013.01)

(58) Field of Classification Search
  USPC ...................................................... 73/152.25
  See application file for complete search history.

(56) References Cited

U.S. PATENT DOCUMENTS

| | | | |
|---|---|---|---|
| 2003/0033879 A1 | 2/2003 | Adewumi | |
| 2003/0185100 A1 | 10/2003 | D'Angelo et al. | |
| 2014/0190264 A1* | 7/2014 | Barshinger | G01N 29/04 73/592 |
| 2014/0260626 A1 | 9/2014 | Kulczyk | |
| 2018/0087372 A1* | 3/2018 | Stokely | G01S 7/54 |

OTHER PUBLICATIONS

Netherlands Search Report for Application No. 2022952 dated Nov. 8, 2019.
ISRWO International Search Report and Written Opinion for PCT/US2018/039021 dated Jan. 25, 2019.
Better Assets Performance Pressure Pulse Allocation and Flow Assurance—Markland AG (brochure 1).
Gudmundsson, et al., Pressure Pulse Analysis of Flow in Tubing and Casing of Gas Lift Wells, Spring 2002 ASME/API Gas Life Workshop, Feb. 5-6, 2002 Houston,Texas.
Halliburton, Successful Clean-Out of Multi-Phase Export Pipeline from North Pacific Ocean to the Russian Shore, Case Study, H012507, Mar. 2017.
Gudmundsson, J. S., & Celius, H. K. (1999). Gas-Liquid Metering Using Pressure-Pulse Technology. SPE Annual Technical Conference and Exhibition, SPE 56584.
Gudmundsson, et al., Pressure Pulse Analysis of Gas Lift Wells, Fall 2001 ASME/API Gas Life Workshop, Nov. 12-13, 2001 Aberdeen.

* cited by examiner

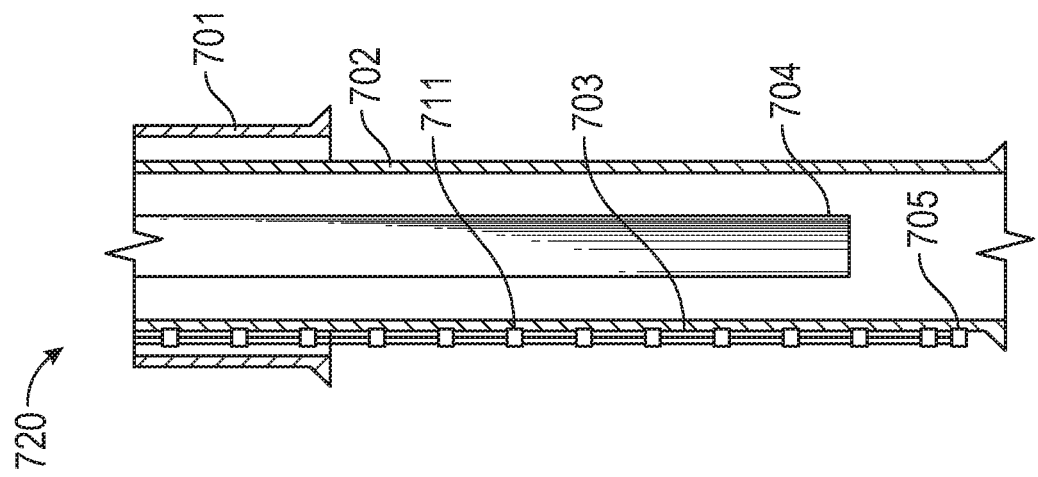
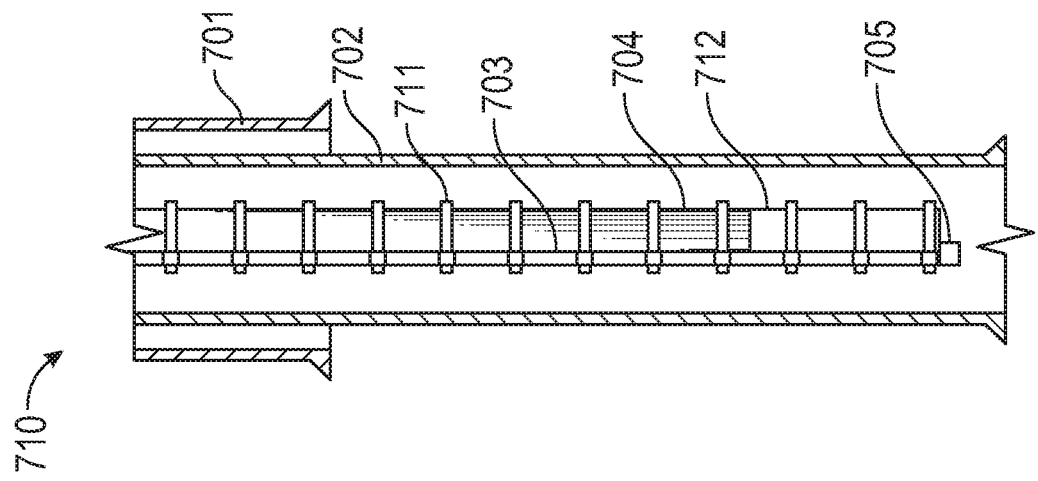
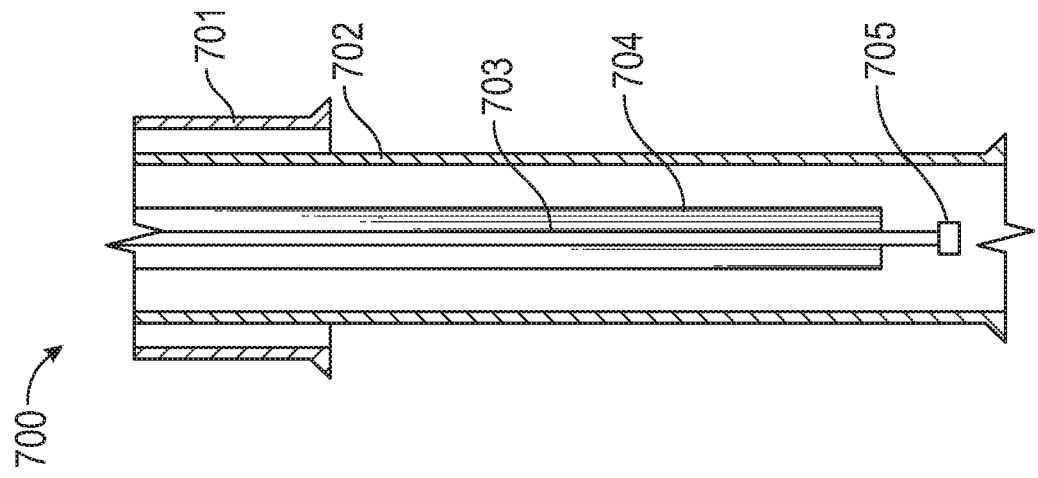

PIPELINE DEPOSITION IMAGING

TECHNICAL FIELD

The present disclosure relates to acoustic sensing logging measurement systems, and more particularly to pipeline deposition imaging.

BACKGROUND

Build-up of deposits in a conduit (such as, a pipeline or a tubular string in a well, etc.) can have a number of undesired effects. For example, increased energy may be required to pump fluid through the conduit at a given flow rate, expenses may be incurred to remove the deposits, efficiency of fluid delivery via the conduit may be impaired, or a useful life of the conduit may be shortened.

BRIEF DESCRIPTION OF THE DRAWINGS

The following figures are included to illustrate certain aspects of the implementations, and should not be viewed as exclusive implementations. The subject matter disclosed is capable of considerable modifications, alterations, combinations, and equivalents in form and function, as will occur to those skilled in the art and having the benefit of this disclosure.

FIGS. 7A-7C illustrate examples of pipeline deposition imaging deployment options that can employ the principles of the present disclosure in accordance with one or more implementations.

DETAILED DESCRIPTION

Figure 1A:
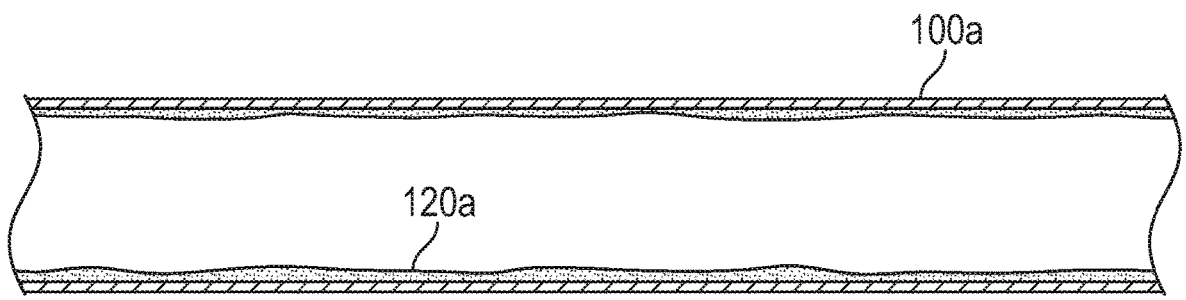
FIGS. 1A and 1B conceptually illustrate cross-sectional views of a conduit containing deposit buildup according to certain aspects of the disclosure.

The subject technology relates to pressure pulse technology that is a non-intrusive method to map out anomalies in pipelines over several kilometers. The technology uses an acoustic transducer to record fluctuations in pressure as a pressure wave travels through the pipe. Typically, a hand-operated or automatic valve is used to generate the source pressure wave. The resolution of such a valve-operated system is inherently limited to the distance the pulse can travel in the minimum time scales over which the valves can be operated (e.g., a few seconds).

The present disclosure provides for a process by which data from two downhole loggers (e.g., acoustic transducers), one at each end of a pipeline, can be used to improve the resolution of a pressure pulse system, even for slow valve operating times. For example, the process of the subject technology uses data from two transducers (e.g., acoustic transducers), instead of one transducer typically employed in traditional approaches, thereby leading to increased resolution of the deposit location and thickness. By improving the deposition estimation resolution, locating smaller deposits in a pipeline more accurately can be realized. The improved resolution in deposition estimation computations supports better decision making by providing more detailed measurement and quantification data for use in resolution of deposition buildup.

The disclosed system addresses a problem in traditional pipeline deposition imaging systems tied to computer technology, namely the technical problem of imaging deposition buildup in pipelines from data produced with a single transducer. The measurements obtained by a single transducer configuration produces data with limited resolution such that the accuracy of mapping the location and thickness of such deposition buildup is adversely reduced. As a result, additional measurements from the same transducer would be required to compensate for the limited resolution in prior measurements, thus requiring additional storage resources and additional post-processing resources such as data filtration and image processing.

The subject technology provides several advantages over the traditional pipeline deposition imaging systems. For example, the subject technology processes pressure pulse signals and inverts such signals for deposit location and thickness computations with improved accuracy, thus delivering significantly higher resolution. Such improvements in the deposition estimation resolution provides for locating smaller deposit buildups more accurately than the traditional pipeline deposition imaging systems that employed only one transducer for recording fluctuations in pressure as the pressure wave travels through the pipeline.

The disclosed system further provides improvements to the functioning of the computer itself because it saves data storage space, reduces system loading times and reduces the cost of system resources. Specifically, measurements gathered from two transducers as opposed to a single transducer reduces the need to obtain additional measurements due to the limited resolution in imaging a deposition buildup by the single transducer, thereby decreasing the amount of data that is processed and stored. The overlap estimation that corresponds to the location and size of the measured deposition buildup is indexed by a corresponding length scale value, which helps reduce system loading times. The deposition imaging is also limited to a relevant window in time that corresponds to an overlap between measured deposit signals indicating an actual deposit width value, which helps to reduce both data storage space and the cost of system resources.

Figure 1B:
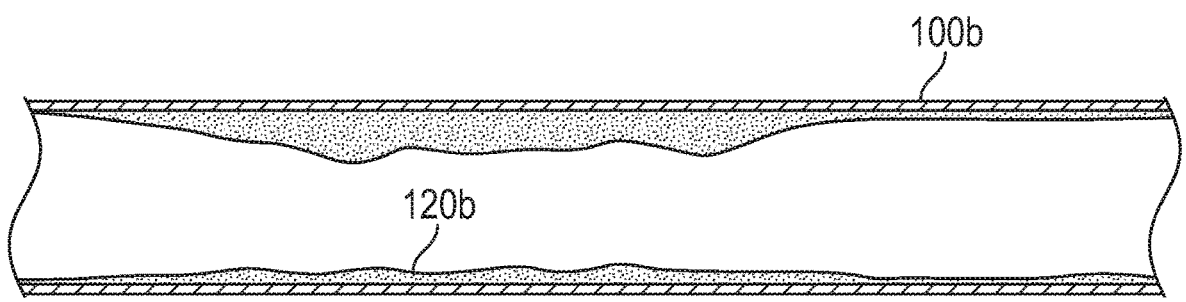

FIGS. 1A and 1B conceptually illustrate cross-sectional views of a conduit containing deposit buildup according to certain aspects of the disclosure. Representatively illustrated in FIGS. 1A are 1B are example conduits 110a, 100b, which can benefit from the principles of the present disclosure. However, it should be clearly understood that the conduits 100a, 100b are merely examples of an application of the principles of the present disclosure in practice, and a wide variety of other examples are possible. Therefore, the scope of the present disclosure is not limited at all to the details of the conduits 100a, 100b described herein and/or depicted in the drawings.

In FIG. 1A, a deposit build-up 120a is relatively uniformly distributed along an interior of the conduit 100a, although the deposit build-up may be somewhat thicker on a lower side of the conduit interior, as compared to an upper side of the conduit interior. In contrast, a deposit buildup 120b in the conduit 100b of FIG. 1B varies substantially along the length of the conduit. The deposit build-ups 120a, 120b can be any types of deposit build-ups (e.g., paraffin, scaling, hydrates, sand or well fines, etc.).

It will be appreciated by those skilled in the art that prior methods of determining a deposit buildup by measuring an overall time of flight of an object (such as, a pig, a gel pill, a tracer, etc.) to traverse through a conduit can only determine an average of the deposit build-up in the conduit. Such methods cannot determine specific thicknesses of the deposit build-up at specific locations.

For example, the time of flight of an object flowed through the conduit 100a of FIG. 1A may be the same as, or different from, the time of flight of the same object flowed through the conduit 100b of FIG. 1B, at a given flow rate. If the times of flight are the same, one may assume that the deposit build-ups 120a, 120b are also the same, but this assumption would clearly be incorrect. If the times of flight are different, then the difference still gives no indication of the characteristics of the deposit build-ups 120a, 120b that cause the times of flight to be different.

Figure 1C:
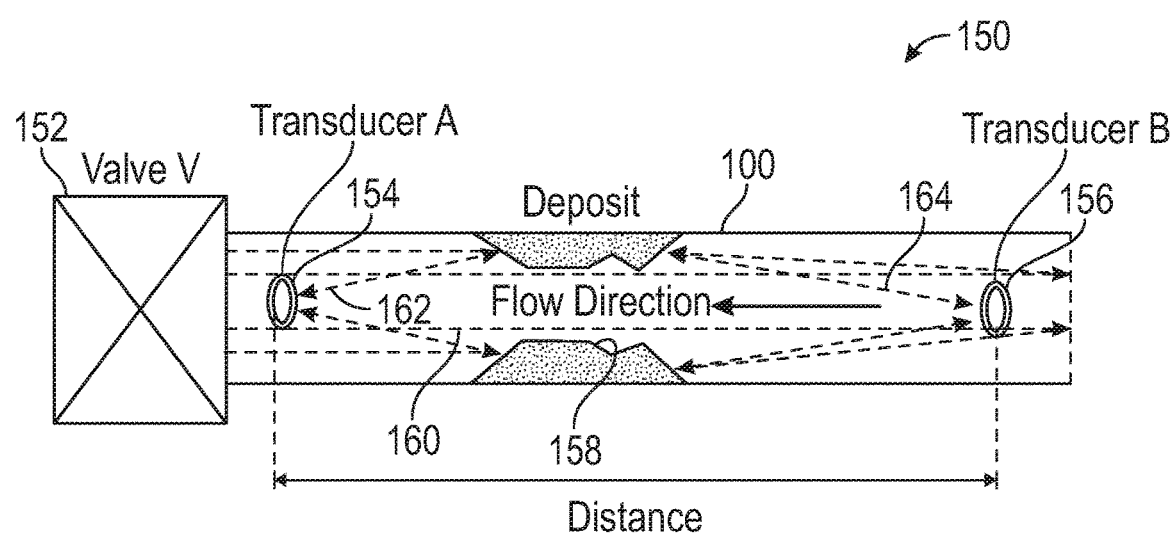
FIG. 1C conceptually illustrates a pressure pulse system according to certain aspects of the disclosure.

FIG. 1C conceptually illustrates a pressure pulse system 150 according to certain aspects of the disclosure. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The pressure pulse system 150 includes a valve 152 mechanically coupled to one end of a conduit 100. A first acoustic sensor (e.g., transducer) 154 is arranged at the one end of the conduit 100 and positioned proximate to the valve 152. A second acoustic sensor (e.g., transducer) 156 is arranged upstream at the opposite end of the conduit 100 and positioned proximate to the surface. In some aspects, the first acoustic sensor 154 and the second acoustic sensor 156 are spaced apart to a distance in a range of 80 kilometers (km) to 100 km. Additionally or alternatively, in an example (not explicitly illustrated), the acoustic sensors (e.g., 154, 156) may be attached to or embedded within the one or more strings of casing lining the wellbore 618 and/or the wall of the wellbore 618 at an axially spaced predetermined distance.

In operation, a positive pressure pulse (e.g., 160) may be generated by first closing the valve 152. As the pressure pulse (e.g., 160) travels from the valve 152, the pressure pulse (e.g., 160) encounters anomalies (e.g., 158), which generate reflection signals (e.g., 162) that travel back to the first acoustic sensor (e.g., 154). As the pressure pulse (e.g., 160) reaches the opposite end of the conduit 100, the pressure pulse is recorded by the second acoustic sensor (e.g., 156). After the reflecting from the opposite end of the conduit 100, the pressure pulse (e.g., 160) travels back to the valve 152 and the first acoustic sensor (e.g., 154). This reflected pulse again encounters the same anomalies (e.g., 158) in the conduit 100 and get re-reflected (e.g., 164) towards the second acoustic sensor (e.g., 156). This pressure profile is recorded by the second acoustic sensor (e.g., 156).

The acoustic sensors (e.g., the transducers) may include electronic sensors, such as hydrophones, piezoelectric sensors, piezoresistive sensors, electromagnetic sensors, accelerometers, or the like. In other implementations, the acoustic sensors may comprise fiber optic sensors, such as point sensors (e.g., fiber Bragg gratings, etc.) distributed at desired or predetermined locations along the length of the conduit 100. In yet other implementations, the acoustic sensors may comprise distributed acoustic sensors, which may also use optical fibers and permit a distributed measurement of local acoustics at any given point along the length of the conduit 100. In still other implementations, the acoustic sensors may include optical accelerometers or optical hydrophones.

Figure 2A:
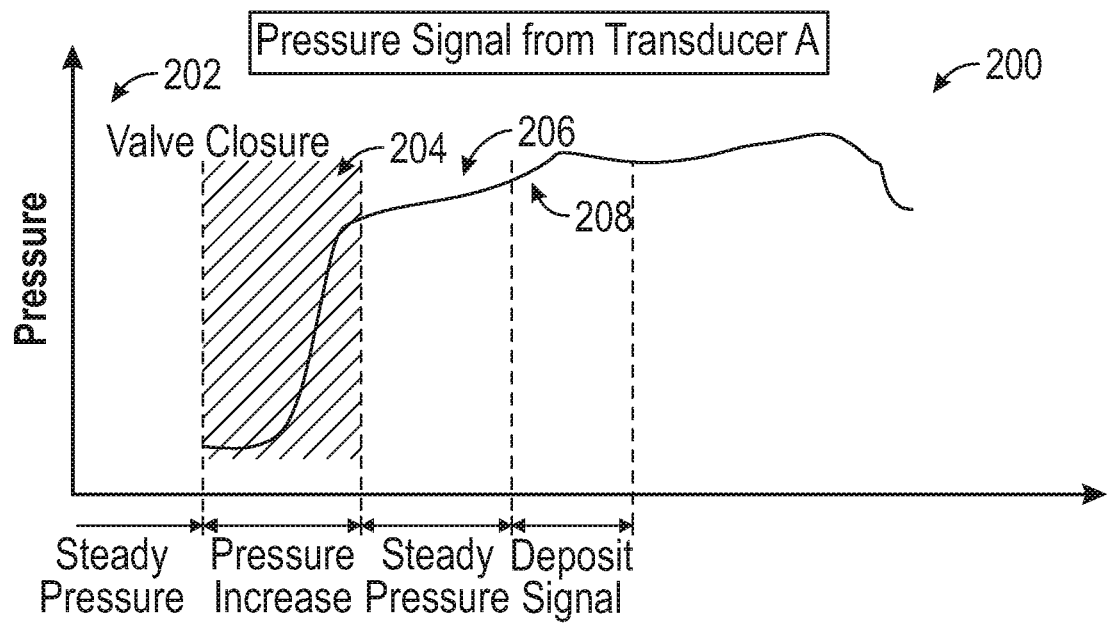
FIGS. 2A and 2B illustrate examples of pressure signal outputs of respective transducers in a pipeline according to certain aspects of the disclosure.
Figure 2B:
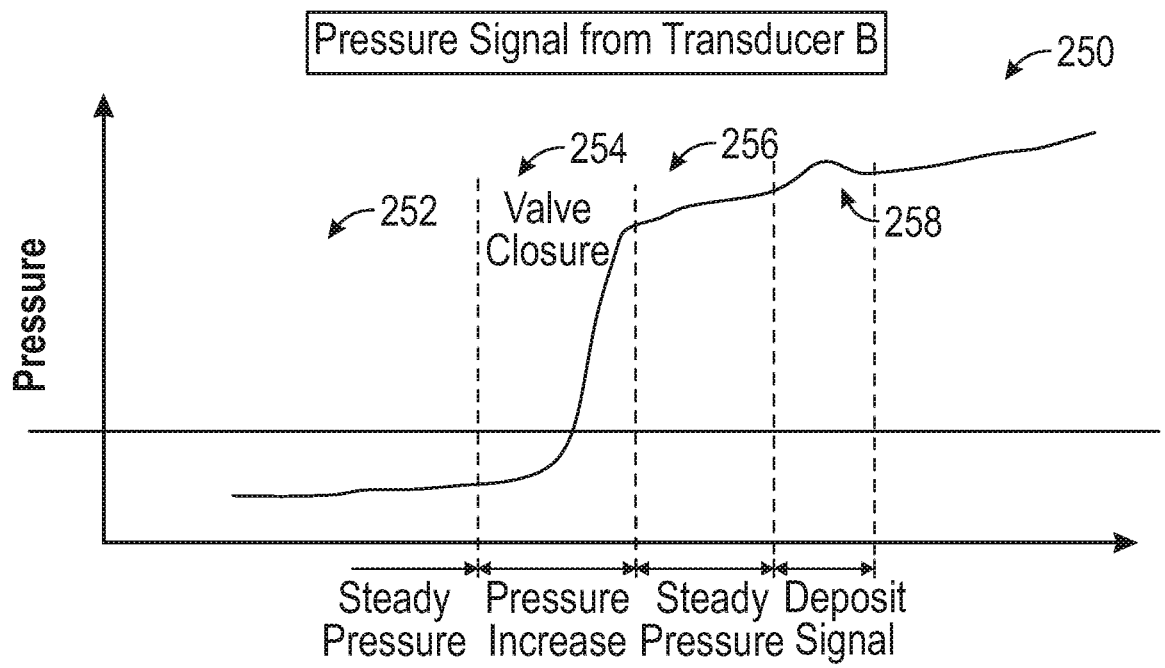

FIGS. 2A and 2B illustrate examples of pressure signal outputs of respective transducers in a pipeline according to certain aspects of the disclosure. In FIG. 2A, a pressure signal output 200 is depicted as a two-dimensional plot, where the y-axis represents pressure and the x-axis represents time. The pressure signal output 200 is a representation of the recorded fluctuations in pressure proximate to the valve 152. In a first time segment prior to a valve closure event (e.g., 202), the pressure is steady. In a second time segment (e.g., 204), the valve closure occurs. In the second time segment (e.g., 204), the pressure begins to change (e.g., increase) during the valve closure. This is because the fluid flow has stopped and more fluid is being packed into the conduit (e.g., 100). In a third time segment (e.g., 206) immediately following the valve closure (e.g., 204), the pressure is continually increasing at a slower rate and begins to stabilize for a duration beyond the third time segment (e.g., 206). In a fourth time segment (e.g., 208), a deposit signal is detected, which identifies the presence of a deposit buildup in the conduit (e.g., 100).

In FIG. 2B, a pressure signal output 250 is also depicted as a two-dimensional plot, where the y-axis represents pressure and the x-axis represents time. The pressure signal output 250 is a representation of the recorded fluctuations in pressure proximate to the end of the conduit that is opposite from the valve 152. As such, the pressure signal output 250 is depicted with a time shift relative to the pressure signal output 200 because of the delayed detection by the second acoustic sensor 156. The representation of the recorded fluctuations in pressure as detected by the second acoustic sensor 156 are very similar to those detected by the first acoustic sensor 154. For example, in a first time segment prior to the valve closure event (e.g., 252), the pressure is steady. In a second time segment (e.g., 254), the valve closure occurs. In the second time segment (e.g., 254), the pressure begins to change (e.g., increase) during the valve closure. In a third time segment (e.g., 256) immediately following the valve closure (e.g., 254), the pressure is continually increasing at a slower rate and begins to stabilize for a duration beyond the third time segment (e.g., 256). In a fourth time segment (e.g., 258), a deposit signal is detected, which identifies the presence of a deposit buildup in the conduit (e.g., 100).

Figure 3:
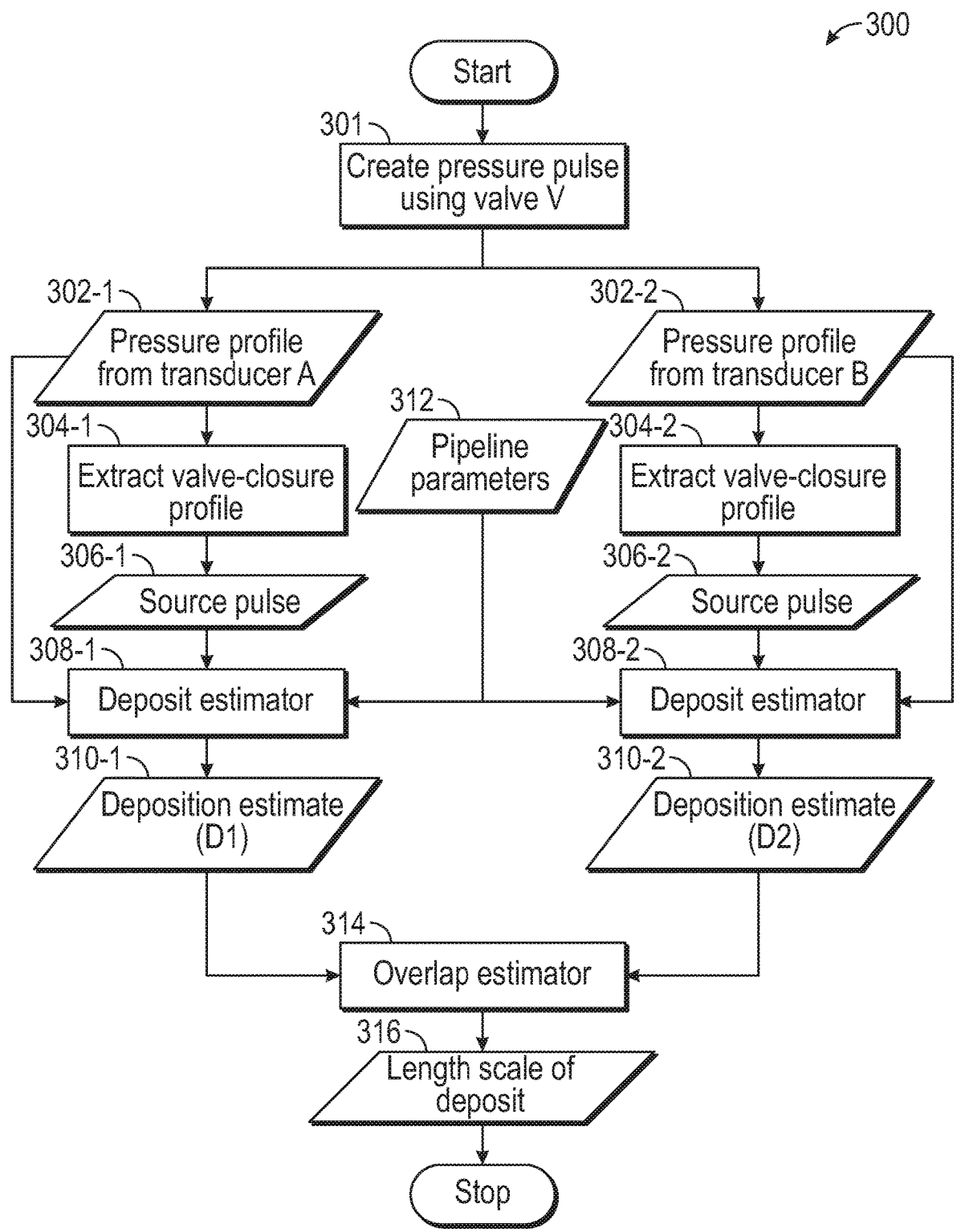
FIG. 3 illustrates an example process of pipeline deposition imaging according to certain aspects of the disclosure.

FIG. 3 illustrates an example process 300 of pipeline deposition imaging according to certain aspects of the disclosure. Further for explanatory purposes, the blocks of the sequential process 300 are described herein as occurring in serial, or linearly. However, multiple blocks of the process 300 may occur in parallel. In addition, the blocks of the process 300 need not be performed in the order shown and/or one or more of the blocks of the process 300 need not be performed.

The process 300 starts at step 301, where a positive pressure pulse is created using a valve (e.g., 152). In this respect, a closure of the valve from an open state creates a pulse within the fluid running through the conduit (e.g., 100). In some implementations, the process 300 includes a step for actuating closure of the valve arranged in the conduit and generating the pressure pulse in response to the actuated closure of the valve. In some examples, the flow direction is moving toward the valve such that the pressure pulse would be traversing the flow direction toward the opposite end of the conduit from the valve location.

Next, at step 302-1, a first pressure profile is obtained from a first acoustic sensor (e.g., the first transducer 154). In some aspects, obtaining the first pressure profile from the first acoustic sensor comprises obtaining a first reflection signal at the first acoustic sensor. In some implementations, the first reflection signal is based on the pressure pulse being reflected acoustically from the deposit buildup (e.g., 158) to the first acoustic sensor in a first direction. In some aspects, the first direction runs in line with the flow direction.

Similarly, at step 302-2, a second pressure profile is obtained from a second acoustic sensor (e.g., the second transducer 156). In some aspects, obtaining the second pressure profile from the second acoustic sensor comprises obtaining a second reflection signal at the second acoustic sensor. In some implementations, the second reflection signal is based on the pressure pulse being reflected acoustically from the deposit buildup (e.g., 158) to the second acoustic sensor in a second direction that is opposite of the first direction. In some aspects, the second direction runs against the flow direction toward the opposite end of the conduit (e.g., 100).

In some implementations, the process 300 includes a step for deploying the first acoustic sensor into the conduit, in which the location of the first acoustic sensor is between a first end of the conduit and a deposit buildup (e.g., 158). In some aspects, the first acoustic sensor is arranged between a location of the valve and the deposit buildup. In some implementations, the process 300 includes a step for deploying the second acoustic sensor into the conduit, in which the location of the second acoustic sensor is between a second end of the conduit that is opposite to the first end of the conduit and the deposit buildup (e.g., 158). In some aspects, the second acoustic sensor is arranged between the surface (proximate to the opposite end of the conduit) and the deposit buildup.

Subsequently, at step 304-1, a valve-closure profile is extracted in response to obtaining the first pressure profile from the first acoustic sensor. In some aspects, the valve-closure profile indicates characteristics of the closure, such as when the closure begins and when the closure ends. In other aspects, the valve-closure profile indicates where the valve closure begins (e.g., position of the valve at start of closure) and where the valve closure ends (e.g., position of the valve at end of closure). In some aspects, the valve-closure profile indicates the rate at which the valve closed from an open position. Similarly, at step 304-2, the valve-closure profile is extracted in response to obtaining the second pressure profile from the second acoustic sensor.

Next, at step 306-1, the source pulse is determined after the first pressure profile is obtained from the first acoustic sensor. Similarly, at step 306-2, the source pulse is determined after the second pressure profile is obtained from the second acoustic sensor. In some aspects, the characteristics of the source pulse are determined, such as the type of pulse signal produced, the magnitude of the pulse signal, the length of the pulse signal, etc.

Subsequently, at step 308-1, an estimation of the deposit buildup is performed using the first pressure profile from the first acoustic sensor and pipeline parameters 312. The estimation of the deposit buildup may include, or at least a portion of, a representation of the pressure pulse (e.g., 200) recorded by the first acoustic sensor. The estimation of the deposit buildup may correspond to the deposit signal (e.g., 208) detected in the representation of the pressure pulse. The estimation of the deposit buildup may include characteristics of the deposit buildup, such as thickness, length, orientation, coordinates within the conduit, etc. Similarly, at step 308-2, the estimation of the deposit buildup is also performed using the second pressure profile from the second acoustic sensor and the pipeline parameters 312.

Next, at step 310-1, an estimation of the deposition is performed in response to determining the deposit buildup estimation in step 308-1. The estimation of the deposition may include a representation of the deposit buildup that measures the amount of solid deposit as a function of distance in pipe, where the x-axis represents the distance in the conduit and the y-axis represents the deposit thickness. In some aspects, the estimation of the deposition may only include measurements of the deposit signal (e.g., 208) extracted from the representation of the pressure pulse (e.g. 200). Similarly, at step 310-2, an estimation of the deposition is also performed in response to determining the deposit buildup estimation in step 308-2 using the pressure pulse signal measurements from the second acoustic sensor.

Figure 5:
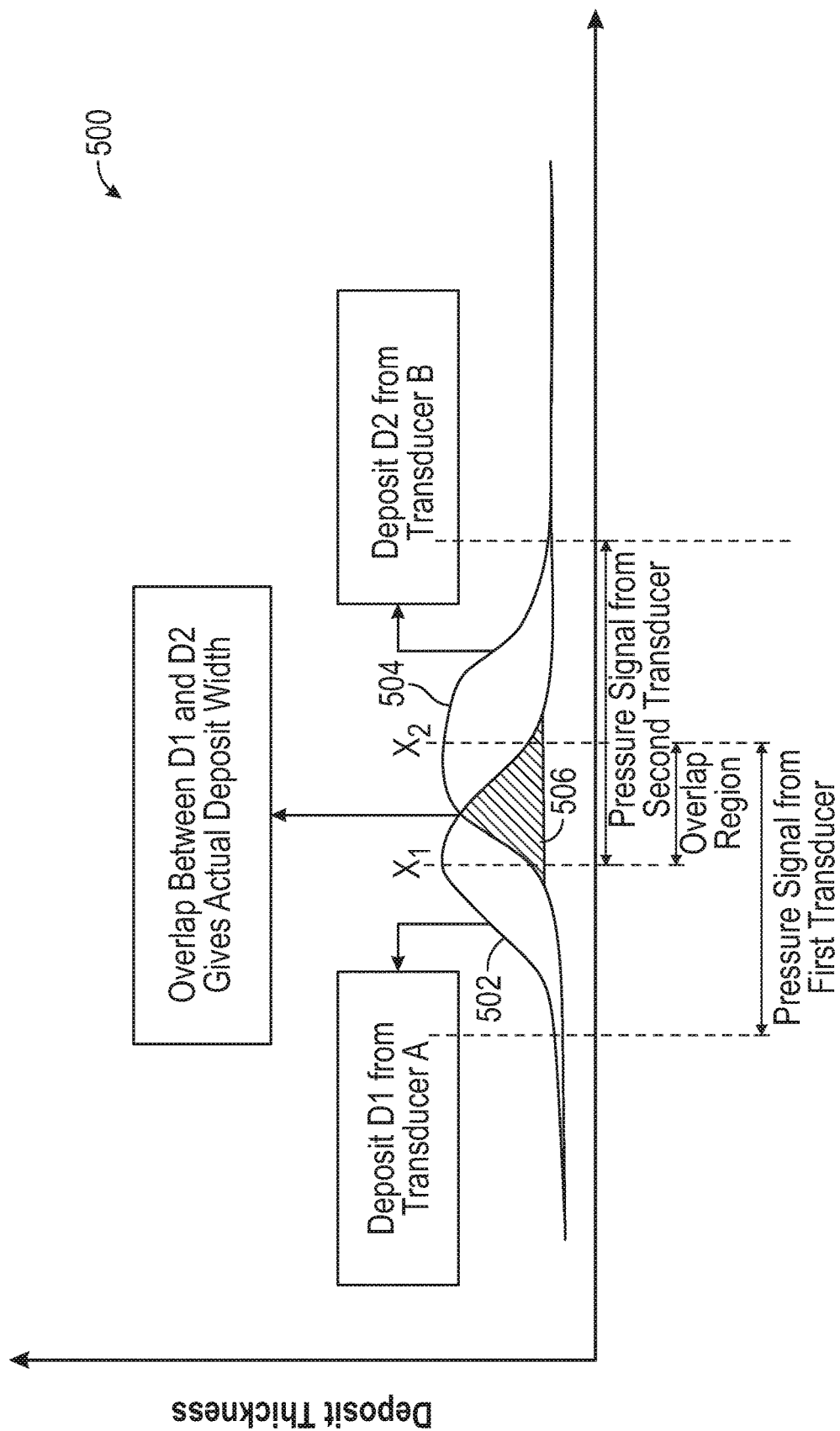
FIG. 5 illustrates an example of an overlap estimation of deposit thicknesses from different transducers in a pipeline according to certain aspects of the disclosure.

Subsequently, at step 314, an overlap estimation is performed using the deposition estimates from both acoustic sensors. For explanatory purposes, the depiction in FIG. 5 will be referenced to explain the overlap estimation, where FIG. 5 illustrates an example of an overlap estimation 500 of deposit thicknesses from different transducers in a pipeline according to certain aspects of the disclosure. Referring to FIG. 5, the overlap estimation is calculated to determine an actual deposit width. The overlap estimation may be determined by having the two deposit estimates (e.g., 502, 504) overlapping one another as a function of time, and the overlap region (e.g., 506) between the two deposit estimates is measured. The deposit estimate 502 includes a representation of the pressure signal from the first acoustic sensor at the location of the deposit signal (e.g., 208). Similarly, the deposit estimate 504 includes a representation of the pressure signal from the second acoustic sensor. In some examples, the area of the overlap region between locations $X_1$ and $X_2$ may be determined. In other examples, the distance between the two overlapped deposit estimates (e.g., the lateral distance between locations $X_1$ and $X_2$) is measured and mapped to the actual deposit width.

In some implementations, determining the estimation of the deposition at step 310-1 may include determining a first Gaussian distribution of a first deposition estimate. Similarly, determining the estimation of the deposition at step 310-2 may include determining a second Gaussian distribution of a second deposition estimate. In this respect, determining the overlap estimation at step 314 may include determining a length of an overlap region (e.g., 506) between the first Gaussian distribution and the second Gaussian distribution.

In some implementations, the overlap estimation at step 314 may be performed by a server-based computing system at the surface. For example, the server-based computing system may be running a cloud network with distributed computing subsystems that individually, or in combination, process the deposit buildup signals to generate the Gaussian distributions that represent respective deposition estimations.

Referring back to FIG. 3, at step 316, a length scale of the deposit buildup is determined. In some aspects, the overlap estimation may provide a length scale of the deposit buildup, which may be an actual length measurement of the deposit buildup scaled relative to the deposit buildup measurement from the first acoustic sensor. In other words, the length scale estimation may indicate by how much a length of the deposit buildup is scaled relative to a first representation of the deposit buildup. For example, the length scale value may indicate that the actual deposit width is 70% (or 0.70) of the length measured based on the first acoustic sensor measurements. In other aspects, the length scale may be scaled relative to the deposit buildup measurement from the second acoustic sensor depending on implementation.

In some implementations, the process 300 includes a step for generating a representation of a deposition in the pipeline from the determined overlap estimation. The representation of the deposition may be used to facilitate downhole operations in the wellbore such as deploying fluid materials into the conduit that are used to remove and/or prevent deposit buildup in the conduit.

Figure 4:
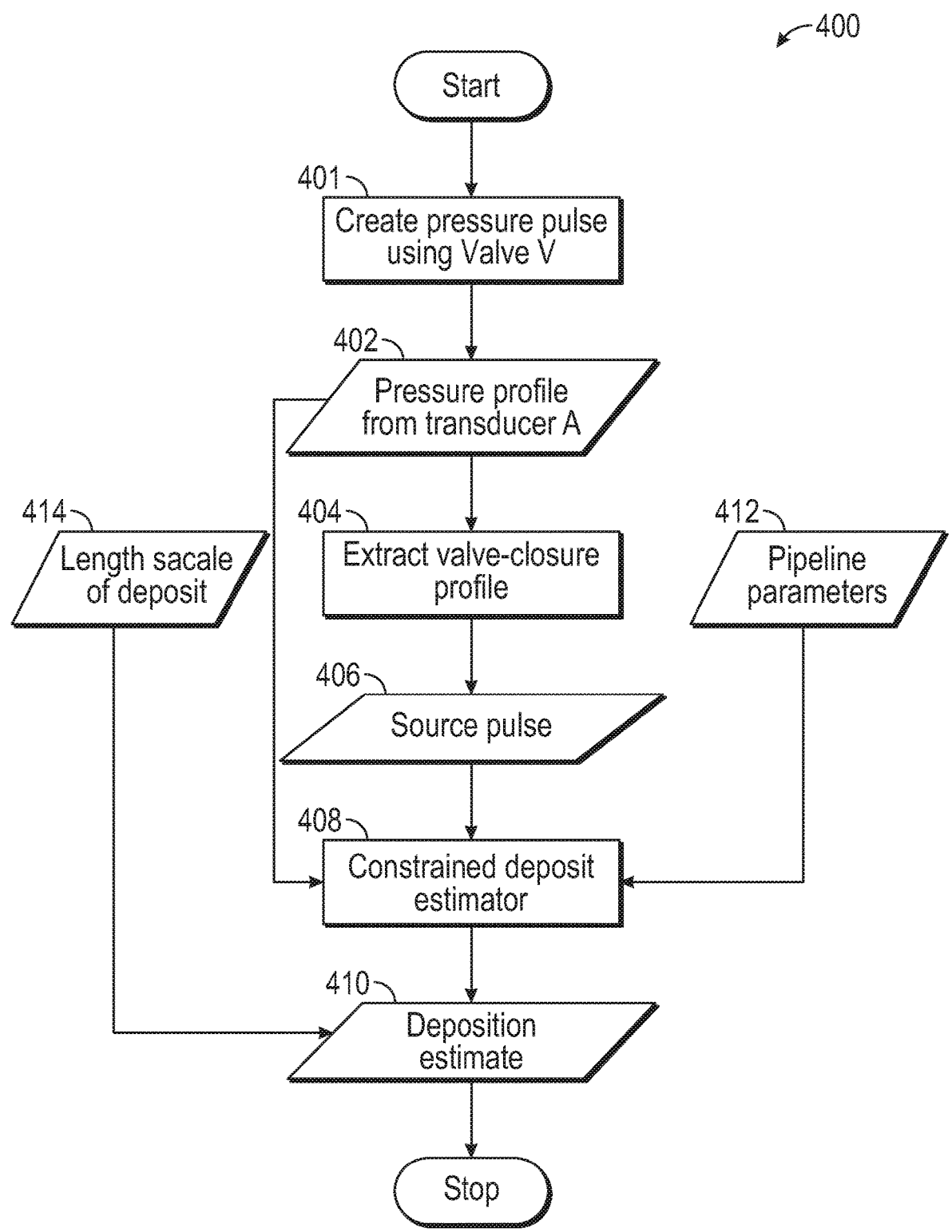
FIG. 4 illustrates another example process of pipeline deposition imaging according to certain aspects of the disclosure.

FIG. 4 illustrates another example process 400 of pipeline deposition imaging according to certain aspects of the disclosure. Further for explanatory purposes, the blocks of the sequential process 400 are described herein as occurring in serial, or linearly. However, multiple blocks of the process 400 may occur in parallel. In addition, the blocks of the process 400 need not be performed in the order shown and/or one or more of the blocks of the process 400 need not be performed.

The process 400 starts at step 401, where a positive pressure pulse is created using a valve (e.g., 152). Next, at step 402, a first pressure profile is obtained from a first acoustic sensor (e.g., the first transducer 154). Subsequently, at step 404, a valve-closure profile is extracted in response to obtaining the first pressure profile from the first acoustic sensor. Next, at step 406, the source pulse is determined after the first pressure profile is obtained from the first acoustic sensor. Subsequently, at step 408, an estimation of the deposit buildup is performed using the first pressure profile from the first acoustic sensor and pipeline parameters 412. Next, at step 410, an estimation of the deposition is performed in response to determining the deposit buildup estimation in step 408.

Subsequently, at step 414, a length scale of the deposit buildup (e.g., 316) is obtained from a prior deposition estimate. In some implementations, the length scale estimation of the deposit buildup is associated with one or more prior deposition estimations. At step 414, the length scale estimation may be applied to the deposition estimate at step 410 to obtain the actual deposit width. In some aspects, the length scale estimation may be applied to a prior deposition estimation associated with the first acoustic sensor (e.g., 154). In this respect, the process 400 may be performed more expeditiously and with lesser resources compared to the process 300.

Figure 6A:
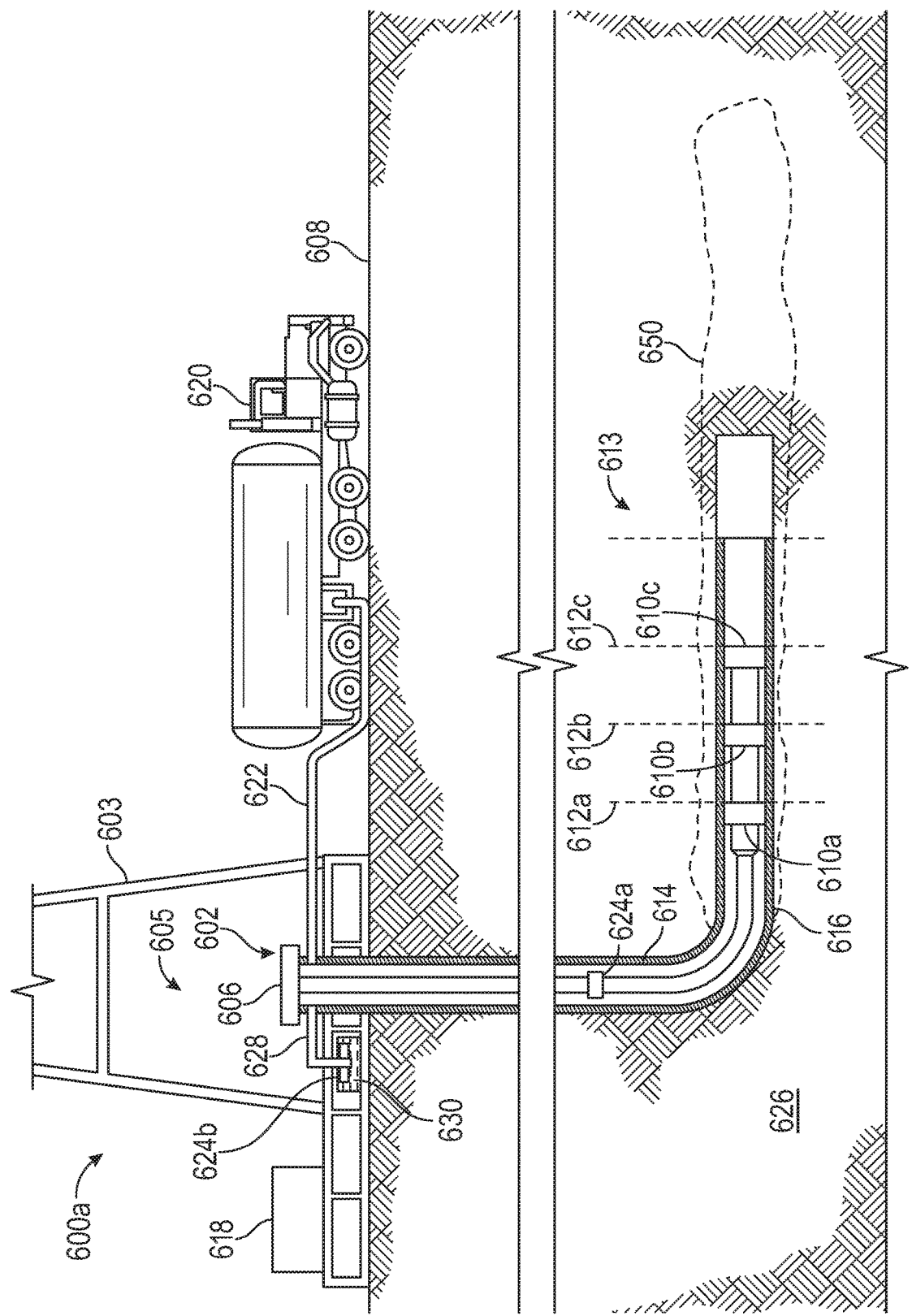
FIG. 6A illustrates a well system that can employ the principles of the present disclosure in accordance with one or more implementations.

FIG. 6A illustrates an exemplary well monitoring and measurement system 600a that may employ the principles of the present disclosure in accordance with one or more implementations. It may be noted that the well monitoring and measurement system 600a can be used in a land-based operation as well as in any sea-based or sub-sea application including a floating platform or sub-surface wellhead installation, as generally known in the art. The well monitoring and measurement system 600a can also include additional or different features that are not shown in FIG. 6A. For example, the well monitoring and measurement system 600a can include additional drilling system components, wireline logging system components, production system components, completion system components, or other components. In the present disclosure, distributed sensing systems may be permanently installed and connected to a sensing fiber with the objective of monitoring production and flow rates over time.

Horizontal drilling techniques for forming a wellbore often include vertically drilling from a surface location to a desired subterranean depth, from which point, drilling is curved or at a sub-terrain plane approximately horizontal to the surface to connect the wellbore to multiple hydrocarbon deposits. Once the wellbore and support structures have been formed, a perforating gun is lowered down the wellbore and is detonated at multiple locations of the wellbore to generate explosions into the wellbore to create a plurality of perforations along rock formations surrounding the wellbore. A fracking fluid is pumped into the wellbore to create and to augment fractures in the rock formations surrounding the perforations. The fracking fluid may also include particles that help to preserve the structural integrity of the perforations and surrounding fractures during operation of the well.

As illustrated, the well monitoring and measurement system 600a may include a service rig 603 that is positioned on the earth's surface 608 and extends over and around a wellbore 614 that penetrates a subterranean formation 626. The service rig 603 may be a drilling rig, a completion rig, a workover rig, a production rig, or the like. In some embodiments, the service rig 603 may be omitted and replaced with a standard surface wellhead completion or installation, without departing from the scope of the disclosure. Moreover, while the well monitoring and measurement system 600a is depicted as a land-based operation, it will be appreciated that the principles of the present disclosure could equally be applied in any sea-based or sub-sea application where the service rig 603 may be a floating platform, a semi-submersible platform, or a sub-surface wellhead installation as generally known in the art.

The wellbore 614 may be drilled into the subterranean formation 626 using any suitable drilling technique and may extend in a substantially vertical direction away from the earth's surface 608 over a vertical wellbore portion. At some point in the wellbore 614, the vertical wellbore portion may deviate from vertical relative to the earth's surface 608 and transition into a substantially horizontal portion 613. In other embodiments, however, the casing string may be omitted from all or a portion of the wellbore 614 and the principles of the present disclosure may equally apply to an "open-hole" environment.

The well monitoring and measurement system 600a may further include a wellbore isolation device that may be conveyed into the wellbore 614 on a tool string 616 that extends from the service rig 603. As described in greater detail below, the wellbore isolation device may operate as a type of casing or borehole isolation device, such as a fracture plug, a bridge plug, a wellbore packer, a wiper plug, a cement plug, or any combination thereof. The tool string 616 that delivers the wellbore isolation device downhole may be, but is not limited to, casing, coiled tubing, intelligent coiled tubing, hybrid coiled tubing, drill pipe, tubing, wireline, slickline, an electric line, or the like. As shown in FIG. 6A, the well monitoring and measurement system 600*a* includes multiple wellbore isolation devices 610*a*, 610*b*, and 610*c*.

Each of the wellbore isolation devices 610*a*, 610*b*, 610*c* may be conveyed downhole to a target location (e.g., 650) within the wellbore 614. In some embodiments, each of the wellbore isolation devices (e.g., 610*a*, 610*b*, 610*c*) is pumped to the target location using hydraulic pressure applied from the service rig 603 at the earth's surface 608. In such embodiments, the tool string 616 serves to maintain control of each of the wellbore isolation devices (e.g., 610*a*, 610*b*, 610*c*) as it traverses the wellbore 614 and may provide power to actuate and set the wellbore isolation devices (e.g., 610*a*, 610*b*, 610*c*) upon reaching the target location. In other embodiments, each of the wellbore isolation devices (e.g., 610*a*, 610*b*, 610*c*) freely falls to the target location under the force of gravity to traverse all or part of the wellbore 614. At the target location, the wellbore isolation device (e.g., 610*a*, 610*b*, 610*c*) may be actuated or "set" to seal the wellbore 614 and otherwise provide a point of fluid isolation within the wellbore 614.

It will be appreciated by those skilled in the art that even though FIG. 6 depicts the wellbore isolation devices (e.g., 610*a*, 610*b*, 610*c*) as being arranged and operating in the horizontal portion of the wellbore 614, the embodiments described herein are equally applicable for use in portions of the wellbore 614 that are vertical, deviated, or otherwise slanted. Moreover, use of directional terms such as above, below, upper, lower, upward, downward, uphole, downhole, and the like are used in relation to the illustrative embodiments as they are depicted in the figures, the upward or uphole direction being toward the top of the corresponding figure and the downward direction being toward the bottom of the corresponding figure, the uphole direction being toward the surface of the well and the downhole direction being toward the toe of the well.

As shown in FIG. 6A, the wellbore isolation devices 610*a*, 610*b*, and 610*c* are respectively positioned at zone boundaries of zones 612*a*, 612*b*, and 612*c* of a wellbore 614 to isolate each of the first, second, and third zones 612*a*, 612*b*, and 612*c* from other portions of the wellbore 614. The wellbore 614 extends from surface 608 of the well head 602, through formation 626, to target region 650. The target region 650 includes the first zone 612*a*, second zone 612*b*, and third zone 612*c*, and may be formed to include additional zones or fewer zones. A tool string 616 is deployed within the wellbore 614. The tool string 616 is operable to supply pressurized fluid to each of the first zone 612*a*, the second zone 612*b*, and the third zone 612*c* to expand perforations at each respective zone.

At the wellhead 606, an inlet conduit 622 is coupled to a fluid source 620 to provide a pressurized wellbore fluid to the well head 602. For example, the pressurized wellbore fluid may be pumped through the inlet conduit 622, down the wellbore 614 and into the third zone 612*c* to fracture the perforations of the zone. Following the fracking operation, the wellbore isolation device 610*c* is deployed proximate to the boundary of the third zone 612*c* to seal and isolate the third zone 612*c* from other portions of the wellbore 614. The process is then repeated for the second zone 612*b* and subsequently the first zone 612*a*, using wellbore isolation devices 610*b* and 610*a*, respectively to isolate the second zone 612*b* and first zone 612*a*.

Subsequently, fluid may be circulated into the well head 602 through the tool string 616 and back toward the surface 608 through an annulus between the outer wall of the tool string 616 and the wall of the wellbore to continue completion efforts. To that end, a diverter or outlet conduit 628 may be connected to a container 630 at the wellhead 606 to provide a fluid return flow path from the wellbore. The wellbore isolation devices 610*a*, 610*b*, and 610*c* may be configured to dissolve upon prolonged exposure to wellbore fluids, including upon exposure to certain solvents that may be included in the wellbore fluid. In such embodiments, the components of the isolation device may be water-soluble (aqueous medium), oil-soluble, or soluble in the presence of other solvent fluids, such as, but not limited to alcohol based fluids, acetone based fluids, and propanediol based fluids.

When fluid is circulated in the well, the return fluid flow path carries debris and particulate from the wellbore, including remnants of dissolved wellbore isolation devices, following dissolution. Such remnants may include insoluble parts, such as tracers or trackers that may be carried in the pressurized wellbore fluid along the fluid return flow path where they are collected in the container 630. In one or more implementations, inline detector 624*a* and collection container detector 624*b* are placed downhole and at the surface 608, respectively, to detect tracers of the wellbore isolation device as they pass by the detectors 624*a* and 624*b*.

In some implementations, operations of the well head 602 is monitored by surface equipment 605 and a computing subsystem 618 at the surface 608. The surface equipment 605 shown in FIG. 6A operates at or above the surface 608, for example, near the well head 602, to control the wellbore isolation devices (e.g., 610*a*, 610*b*, 610*c*) and possibly other downhole equipment or other components of the well monitoring and measurement system 600. The computing subsystem 618 receives and analyzes logging data from the wellbore isolation devices (e.g., 610*a*, 610*b*, 610*c*). The well monitoring and measurement system 600*a* can include additional or different features, and the features of an logging system can be arranged and operated as represented in FIG. 6A or in another manner. In some implementations, the computing subsystem 618 computes the overlap estimation (e.g., 314, 410) and the length scale estimation (e.g., 316, 414).

In some implementations, the well monitoring and measurement system 600*a* employs a coiled tubing system. Coiled tubing systems are well known in the oil and gas industry. The term normally connotes a relatively small diameter continuous tubing string that can be transported to a well site on a drum or in a reel. Some methods for inserting coiled tubing systems into existing wells are well known in the art. As oil and gas exploration technology continues to improve the demand for better wellbore information grows and there has been more interest in using coiled tubing to deploy more instrumentation into the wellbore, particularly pressure and temperature sensors.

Figure 6B:
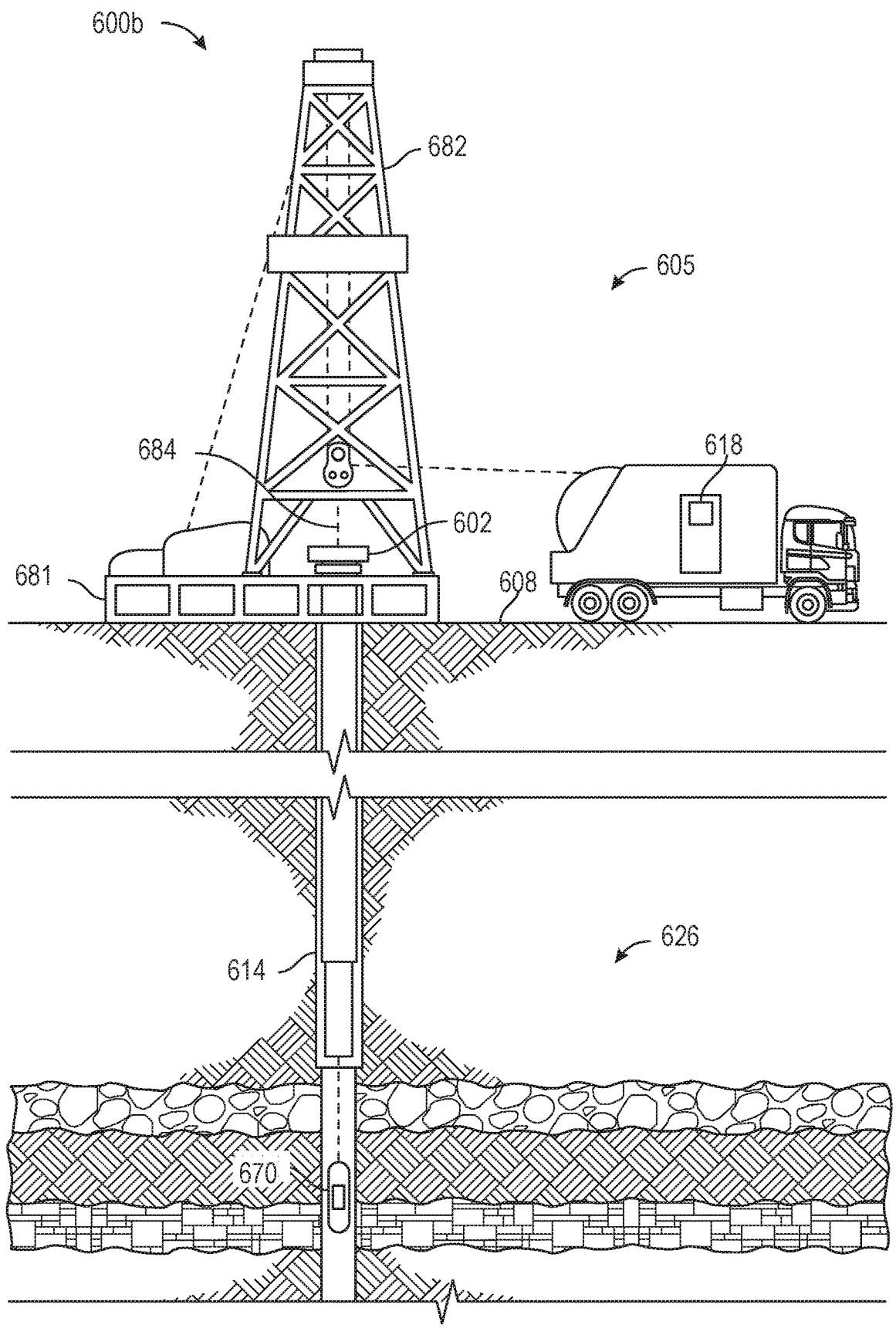
FIG. 6B illustrates a wireline system suitable for implementing the processes described herein in accordance with one or more implementations.

FIG. 6B illustrates a logging assembly 600*b* having a wireline system suitable for implementing the logging analysis methods described herein in accordance with one or more implementations. The well system 600*b* includes the logging tool 670 in a wireline logging environment. The surface equipment 605 includes, but is not limited to, a platform 681 disposed above the surface 608 equipped with a derrick 682 that supports a wireline cable 684 extending into the wellbore 614. Wireline logging operations are performed, for example, after a drill string is removed from the wellbore 614, to allow the wireline logging tool 670 to be lowered by wireline or logging cable into the wellbore 614. Typically, the logging tool 670 is lowered to a region of interest and subsequently pulled upward at a substantially constant speed. During the upward trip, instruments included in the logging tool 670 may be used to perform measurements on the subterranean formation 626 adjacent the wellbore 614 as the logging tool 670 passes by.

In FIG. 6B, the logging tool 670 may include one or more wireline instrument(s) that may be suspended into the wellbore 614 by the wireline cable 684. The wireline instrument(s) may include acoustic sensors such as acoustic transducers, which may be communicably coupled to the wireline cable 684 (also see FIG. 7A). The wireline cable 684 may include conductors for transporting power to the wireline instrument and also facilitate communication between the surface and the wireline instrument. In some implementations, a second acoustic sensor (e.g., 156) may permanently mounted to an inner wall of a conduit (e.g., inlet conduit 622) deployed inside the wellbore 614, while the first acoustic sensor (e.g., 154) is mounted onto the wireline cable 684 and positioned proximate to a valve (e.g., 152) located downstream inside the wellbore 614.

FIGS. 7A-7C illustrate examples of distributed sensing deployment options that can employ the principles of the present disclosure in accordance with one or more implementations. Wellbores for use in oil and gas exploration and production are often drilled in stages where a first stage is drilled and lined with a casing (e.g., surface casing 701), then a second, smaller diameter stage is drilled and lined with a casing (e.g., production casing 702), and so on. In some implementations, the wellbore 114 may be completed by cementing a casing string within the wellbore 114 along all or a portion thereof. Once drilling of the wellbore (e.g., 114) is finished, the wellbore completion operations are then undertaken. Completion operations generally refer to the events necessary to bring a wellbore into production once drilling operations have concluded. For example, completion operations may be performed with a completion string having tools coupled thereto (e.g., packers, side pocket mandrels, perforation guns, and the like) that provide for enablement of safe and efficient production from an oil or gas well.

In FIG. 7A, a wireline assembly 700 includes a tubing 704 deployed into a wellbore (e.g., 114) and routed through the production casing 702. A wireline cable (e.g., cable 703) housing optical fibers may be routed through the tubing 704, and later retrievable from the wellbore 14. In some aspects, the optical fibers are coupled to a wireline cable (e.g., cable 703). The optical fibers can be coupled to the wireline such that the optical fibers are removable with the wireline. The cable 703 can include multiple optical fibers. For example, the optical fibers can include one or more single-mode optical fibers and one or more multi-mode optical fibers. Each of the optical fibers may include one or more optical sensors along the optical fibers. The optical sensors may be deployed in the wellbore 114 and used to sense and transmit measurements of downhole conditions in the wellbore 114 to the earth's surface (e.g., 108). A first transducer 705 is coupled to a distal end of the cable 703 for taking measurements at the toe end of the lateral wellbore. In some aspects, the first transducer 705 includes a pressure gauge for measuring pressure proximate to a valve (e.g., 152) located downstream from the surface (e.g., about 80 km to 100 km). In some aspects, a second transducer may be coupled to the cable 703 at a location upstream from the first transducer 705. In other aspects, the second transducer is permanently coupled to an inner wall of the tubing 704. In still other aspects, the second transducer is permanently coupled to an inner wall of the production casing 702.

In FIG. 7B, a tubing assembly 710 includes the tubing 704 deployed into the wellbore (e.g., 114) and routed through the production casing 702. The cable 703 may be routed through the tubing 704 and permanently installed along an outer surface of the tubing 704. The optical fibers housed in the cable 703 may be retained against the outer surface of the tubing 704 at intervals (e.g., every other joint) by coupling bands (e.g., cross-coupling protectors 711) that extend around the tubing 704. In some aspects, a tubing tail 712 can be extended below a bottom perforation. The first transducer 705 is coupled to a distal end of the tubing 704 for taking pressure measurements at the toe end of the lateral wellbore. In some aspects, a second transducer may be coupled to the tubing 704 at a location upstream from the first transducer 705. In other aspects, the second transducer is permanently coupled to an inner wall of the tubing tail 712. In still other aspects, the second transducer is permanently coupled to an inner wall of the production casing 702.

In FIG. 7C, a casing assembly 720 includes a tubing 704 deployed into the wellbore (e.g., 114) and routed through the production casing 702. The cable 703 may be routed through the surface casing 701 and permanently installed along an outer surface of the production casing 702. The optical fibers housed in the cable 703 may be retained against the outer surface of the production casing 702 at intervals (e.g., every other joint) by coupling bands (e.g., cross-coupling protectors 711) that extend around the production casing 702. The first transducer 705 is coupled to a distal end of the tubing 704 for taking pressure measurements at the toe end of the lateral wellbore. In some aspects, a second transducer may be coupled to the tubing 704 at a location upstream from the first transducer 705. In other aspects, the second transducer is permanently coupled to an inner wall of the tubing 704. In still other aspects, the second transducer is permanently coupled to an inner wall of the production casing 702.

Figure 8:
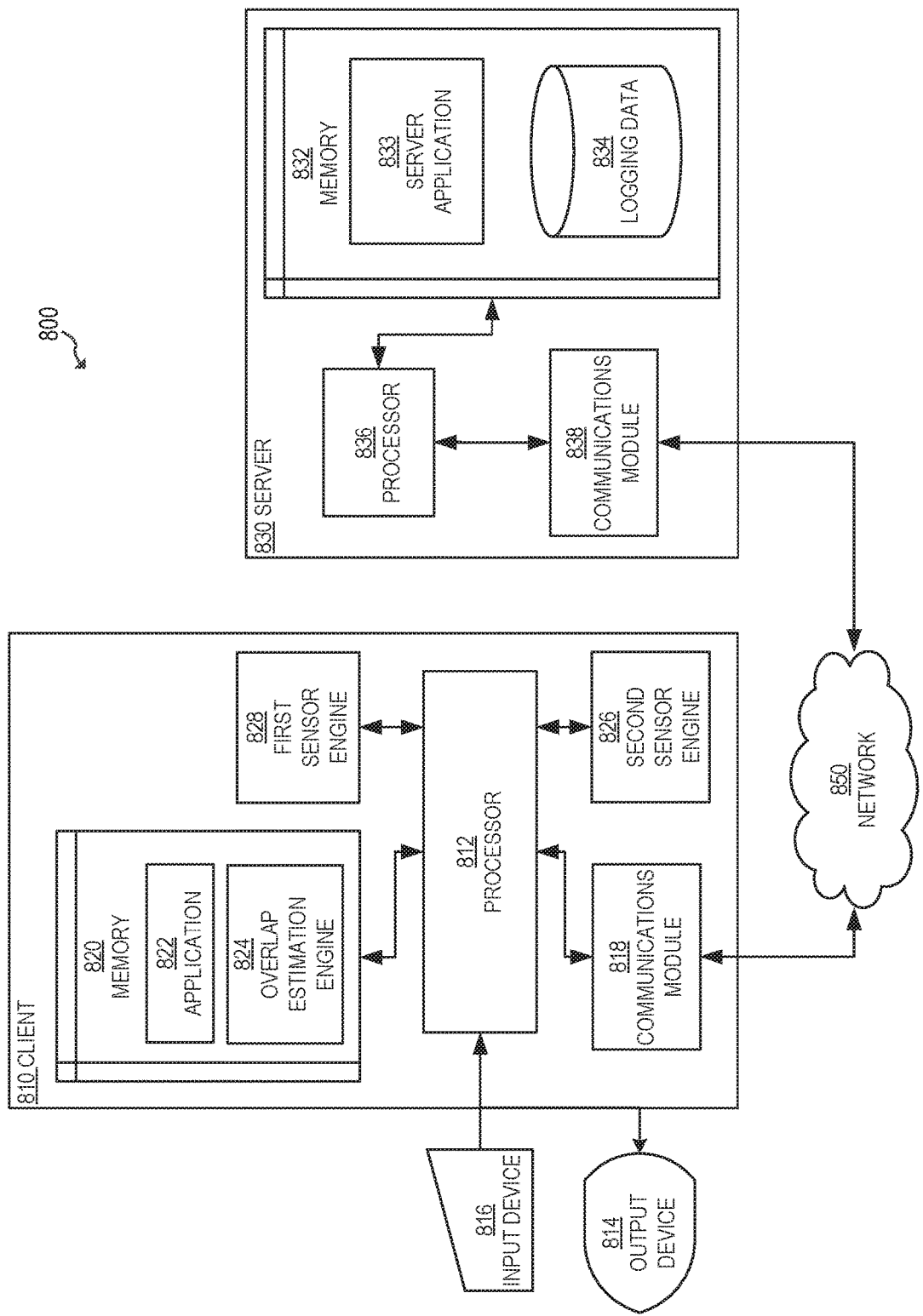
FIG. 8 is a block diagram illustrating an example client and server according to certain aspects of the disclosure.

FIG. 8 is a block diagram 800 illustrating an example server 830 and client 810 in the architecture 800 of FIG. 8 according to certain aspects of the disclosure. The client 810 may represent the tool string 616 of FIG. 6A and the server 830 may represent the computing subsystem 618 of FIG. 6A in some implementations, or the client 810 may represent the computing subsystem 618 and the server 830 may represent the off-site computing facilities in other implementations.

The client 810 and the server 830 are connected over the network 850 via respective communications modules 818 and 838. The communications modules 818 and 838 are configured to interface with the network 850 to send and receive information, such as data, requests, responses, and commands to other devices on the network. The communications modules 818 and 838 can be, for example, modems or Ethernet cards.

The server 830 includes a memory 832, a processor 836, and a communications module 838. The memory 832 of the server 830 includes a server application 832. The processor 836 of the server 830 is configured to execute instructions, such as instructions physically coded into the processor 836, instructions received from software in the memory 832, or a combination of both. The memory 832 includes a server application 833. The processor 836 of the server 830 executes instructions from the server application 833 causing the processor 836 to process acoustic sensing signals received from the client 810 over the network 850 in order to determine an overlap estimation between two overlapping deposition estimates, where the overlap estimation maps to an actual deposit width of a deposition buildup in a conduit. The memory 832 also includes logging data 834. The logging data 834 may include the logging measurements received from the client 810 over the network 850. In some aspects, the server 830 may post-process the measured acoustic signals (e.g., reflection signals of pressure pulses) that may be stored in the logging data 834.

The client 810 includes a processor 812, the communications module 818, and the memory 820 that includes an application 822. The client 810 also includes a first sensor engine 828 and a second sensor engine 826. The application 822 may be an acoustic sensing analysis tool, or physically coded instructions that execute a real-time analysis of acoustic signal measurements from the first and second transducers to determine a pipeline deposition image representation. The client 810 also includes an input device 816, such as a keyboard, mouse, touchscreen and/or game controller, and an output device 814, such as a display. The memory 820 also includes an overlap estimation engine 824 for computing the overlap between the deposit signal representations. In some aspects, the processor 812 receives user input via the input device 816, where the user input indicates the type of material of an annulus composition such that velocity and density metrics of an acoustic signal traveling through the wellbore 618 can be determined.

In some implementations, the processor 812, using the application 822, may perform the steps of the process 300 (FIG. 3) and/or the process 400 (FIG. 4). The processor 812 of the client 810 is configured to execute instructions, such as instructions physically coded into the processor 812, instructions received from software in the memory 820, or a combination of both. The processor 812 of the client 810 executes instructions from the application 822 causing the processor 812 to run a process that generates a synthetic aperture to image leaks and sound sources.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 9:
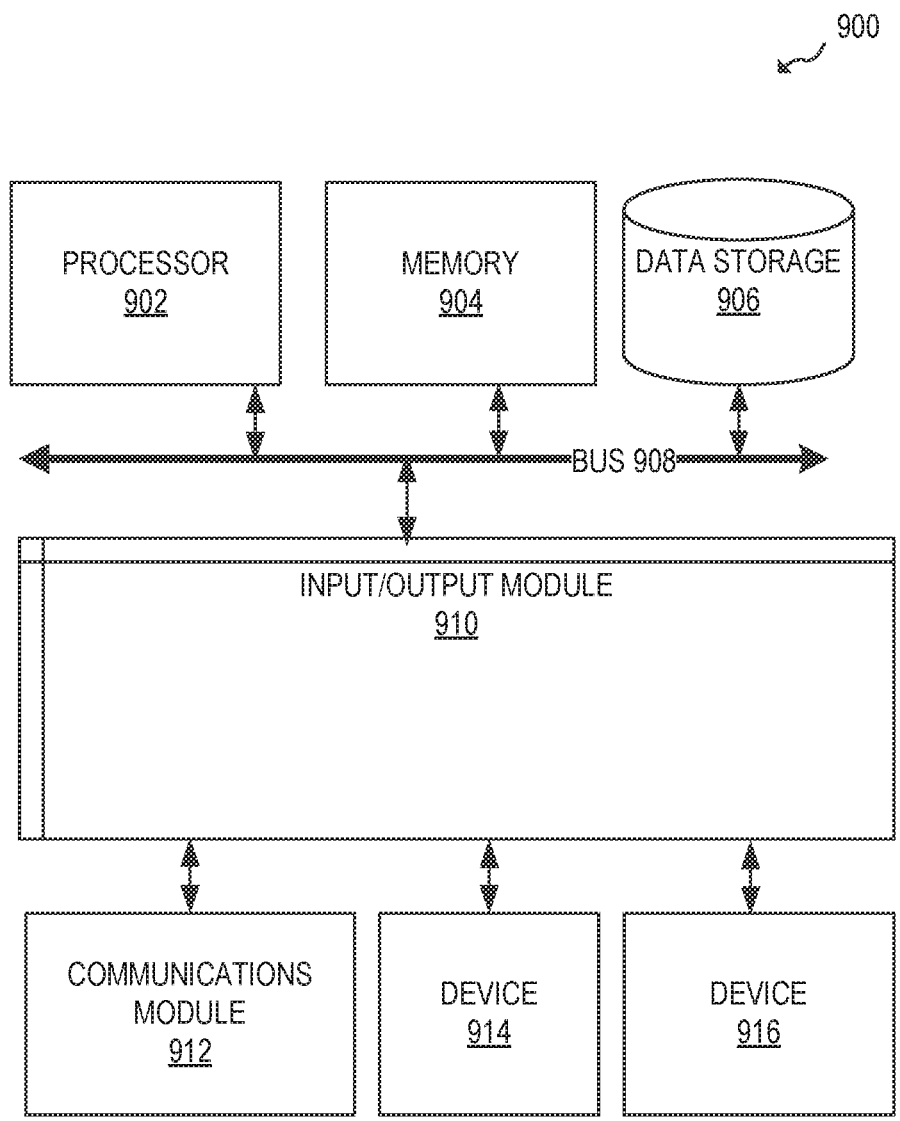
FIG. 9 is a block diagram illustrating an example computer system with which the client of FIG. 8 can be implemented.

FIG. 9 is a block diagram illustrating an exemplary computer system 900 with which the client 810 and server 830 of FIG. 8 can be implemented. In certain aspects, the computer system 900 may be implemented using hardware or a combination of software and hardware, either in a dedicated server, integrated into another entity, or distributed across multiple entities.

Computer system 900 (e.g., client 810 and server 830) includes a bus 908 or other communication mechanism for communicating information, and a processor 902 (e.g., processor 812 and 836) coupled with bus 908 for processing information. By way of example, the computer system 900 may be implemented with one or more processors 902. Processor 902 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 900 can include, in addition to hardware, code that creates an execution environment for the computer program in question, e.g., code that constitutes processor firmware, a protocol stack, a database management system, an operating system, or a combination of one or more of them stored in an included memory 904 (e.g., memory 820 and 832), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 908 for storing information and instructions to be executed by processor 902. The processor 902 and the memory 904 can be supplemented by, or incorporated in, special purpose logic circuitry.

The instructions may be stored in the memory 904 and implemented in one or more computer program products, i.e., one or more modules of computer program instructions encoded on a computer readable medium for execution by, or to control the operation of, the computer system 900, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 904 may also be used for storing temporary variable or other intermediate information during execution of instructions to be executed by processor 902.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 900 further includes a data storage device 906 such as a magnetic disk or optical disk, coupled to bus 908 for storing information and instructions. Computer system 900 may be coupled via input/output module 910 to various devices. The input/output module 910 can be any input/output module. Exemplary input/output modules 910 include data ports such as USB ports. The input/output module 910 is configured to connect to a communications module 912. Exemplary communications modules 912 (e.g., communications modules 818 and 838) include networking interface cards, such as Ethernet cards and modems. In certain aspects, the input/output module 910 is configured to connect to a plurality of devices, such as an input device 914 (e.g., input device 816) and/or an output device 916 (e.g., output device 814). Exemplary input devices 914 include a keyboard and a pointing device, e.g., a mouse or a trackball, by which a user can provide input to the computer system 900. Other kinds of input devices 914 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 916 include display devices such as a LCD (liquid crystal display) monitor, for displaying information to the user.

According to one aspect of the present disclosure, the client 810 and server 830 can be implemented using a computer system 900 in response to processor 902 executing one or more sequences of one or more instructions contained in memory 904. Such instructions may be read into memory 904 from another machine-readable medium, such as data storage device 906. Execution of the sequences of instructions contained in the main memory 904 causes processor 902 to perform the process steps described herein. One or more processors in a multi-processing arrangement may also be employed to execute the sequences of instructions contained in the memory 904. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 850) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 900 can include clients and servers. A client and server are generally remote from each other and typically interact through a communication network. The relationship of client and server arises by virtue of computer programs running on the respective computers and having a client-server relationship to each other. Computer system 900 can be, for example, and without limitation, a desktop computer, laptop computer, or tablet computer. Computer system 900 can also be embedded in another device, for example, and without limitation, a mobile telephone such as a smartphone.

The term "machine-readable storage medium" or "computer readable medium" as used herein refers to any medium or media that participates in providing instructions to processor 902 for execution. Such a medium may take many forms, including, but not limited to, non-volatile media, volatile media, and transmission media. Non-volatile media include, for example, optical or magnetic disks, such as data storage device 906. Volatile media include dynamic memory, such as memory 904. Transmission media include coaxial cables, copper wire, and fiber optics, including the wires that comprise bus 908. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

Various examples of aspects of the disclosure are described below. These are provided as examples, and do not limit the subject technology.

A computer-implemented method includes obtaining a first reflection signal at a first sensor device arranged at a first location in a conduit; determining a representation of a first deposition estimation in the conduit from the obtained first reflection signal; obtaining a second reflection signal at a second sensor device arranged at a second location in the conduit; determining a representation of a second deposition estimation in the conduit from the obtained second reflection signal; determining an overlap estimation between the representation of the first deposition estimation and the representation of the second deposition estimation; and generating a representation of a deposition in the conduit from the determined overlap estimation.

The method further includes actuating closure of a valve arranged in the conduit; and generating a pressure pulse in response to the actuated closure of the valve.

The method further includes deploying the first sensor device into the conduit, wherein the first location is between a first end of the conduit and the deposition, wherein the valve is mechanically coupled to the first end of the conduit.

The method further includes deploying the second sensor device into the conduit, wherein the second location is between the deposition and a second end of the conduit that is opposite of the first end.

In some aspects, the first reflection signal is based on the pressure pulse being reflected acoustically from the deposition to the first sensor device in a first direction, and wherein the second reflection signal is based on the pressure pulse being reflected acoustically from the deposition to the second sensor device in a second direction different from the first direction.

In some aspects, the determining the representation of the first deposition estimation includes determining a first pressure profile from the first sensor device using the first reflection signal; extracting a closure profile of the valve; obtaining one or more characteristics of the pressure pulse from the extracted closure profile of the valve; obtaining one or more parameters of the conduit; and computing the first deposition estimation with one or more of the first pressure profile, the one or more characteristics of the pressure pulse, or the one or more parameters of the conduit.

In some aspects, the determining the representation of the second deposition estimation includes determining a second pressure profile from the second sensor device using the second reflection signal; extracting a closure profile of the valve; obtaining one or more characteristics of the pressure pulse from the extracted closure profile of the valve; obtaining one or more parameters of the conduit; and computing the second deposition estimation with one or more of the second pressure profile, the one or more characteristics of the pressure pulse, or the one or more parameters of the conduit.

The method further includes determining a length scale estimation of the deposition, the length scale estimation indicating by how much a length of the deposition is scaled relative to the representation of the first deposition estimation.

In some aspects, the generating the representation of the deposition in the conduit includes obtaining the length scale estimation of the deposition associated with one or more prior deposition estimations; and applying the length scale estimation to a prior deposition estimation associated with the first sensor device.

In some aspects, the determining the representation of the first deposition estimation includes determining a first Gaussian distribution of the first deposition estimation. In some aspects, the determining the representation of the second deposition estimation comprises determining a second Gaussian distribution of the second deposition estimation. In some aspects, the determining the overlap estimation comprises determining a length of an overlap region between the first Gaussian distribution and the second Gaussian distribution.

In some aspects, the representation of the deposition in the conduit indicates a location of the deposition within the conduit and a thickness of the deposition.

A non-transitory computer-readable storage medium including instructions that, when executed by a processor, cause the processor to perform a method. The method includes generating a pressure pulse in a conduit using a valve arranged in the conduit; generating a first pressure profile based on the pressure pulse with a first transducer arranged at a first location in a conduit; determining a first deposition estimation in the conduit from the first pressure profile; generating a second pressure profile based on the pressure pulse with a second transducer arranged at a second location in the conduit; determining a second deposition estimation in the conduit from the second pressure profile; determining an overlap estimation between the first deposition estimation and the second deposition estimation; generating a representation of a deposition in the conduit from the determined overlap estimation; and facilitating a conduit operation with the generated representation of the actual deposition in the conduit.

In some aspects, the generating the first pressure profile comprises receiving a first reflection signal. In some aspects, the first reflection signal is based on the pressure pulse being reflected acoustically from the deposition to the first transducer in a first direction. In some aspects, the generating the second pressure profile comprises receiving a second reflection signal. In some aspects, the second reflection signal is based on the pressure pulse being reflected acoustically from the deposition to the second transducer in a second direction different from the first direction.

In some aspects, the determining the first deposition estimation includes determining a first pressure profile from the first transducer using the first reflection signal; extracting a closure profile of the valve; obtaining one or more characteristics of the pressure pulse from the extracted closure profile of the valve; obtaining one or more parameters of the conduit; and computing the first deposition estimation with one or more of the first pressure profile, the one or more characteristics of the pressure pulse, or the one or more parameters of the conduit.

In some aspects, the determining the second deposition estimation includes determining a second pressure profile from the second transducer using the second reflection signal; extracting a closure profile of the valve; obtaining one or more characteristics of the pressure pulse from the extracted closure profile of the valve; obtaining one or more parameters of the conduit; and computing the second deposition estimation with one or more of the second pressure profile, the one or more characteristics of the pressure pulse, or the one or more parameters of the conduit.

The method also includes determining a length scale estimation of the deposition, the length scale estimation indicating by how much a length of the deposition is scaled relative to the first deposition estimation.

In some aspects, the generating the representation of the deposition in the conduit includes obtaining the length scale estimation of the deposition associated with one or more prior deposition estimations; and applying the length scale estimation to a prior deposition estimation associated with the first transducer.

In some aspects, the determining the representation of the first deposition estimation comprises determining a first Gaussian distribution of the first deposition estimation. In some aspects, the determining the representation of the second deposition estimation comprises determining a second Gaussian distribution of the second deposition estimation. In some aspects, the determining the overlap estimation comprises determining a length of an overlap region between the first Gaussian distribution and the second Gaussian distribution.

In some aspects, the representation of the deposition in the conduit indicates a location of the deposition within the conduit and a thickness of the deposition.

A system includes a conduit comprising a first transducer and a second transducer and one or more processors. The system also includes a non-transitory computer-readable medium operably coupled to the conduit to receive acoustic signals through the conduit and encoded with instructions that, when executed by the one or more processors, cause the one or more processors to perform operations including deploying the conduit into a wellbore penetrating one or more subterranean formations, the conduit coupled to a computing subsystem positioned on a surface; actuating closure of a valve coupled to the conduit in response to fluid flow through the conduit, the valve being configured to generate an acoustic signal for transmission through fluid in the conduit in response to the actuated closure of the valve, wherein the first transducer and the second transducer are interposed between opposite ends of the conduit for measuring deposition buildup in the wellbore from one or more reflection signals based on the generated acoustic signal; obtaining pressure measurements from the first transducer and the second transducer; processing the pressure measurements with the computing subsystem; generating a representation of the deposition buildup in the wellbore based on an overlap estimation from the processed pressure measurements, the representation of the deposition buildup indicating a location of the deposition buildup within the wellbore and a thickness of the deposition buildup; and facilitating downhole operations in the wellbore based on the generated representation of the deposition buildup.

In one or more aspects, examples of clauses are described below.

A method comprising one or more methods, operations or portions thereof described herein.

An apparatus comprising one or more memories and one or more processors (e.g., 710), the one or more processors configured to cause performing one or more methods, operations or portions thereof described herein.

An apparatus comprising one or more memories (e.g., 920, one or more internal, external or remote memories, or one or more registers) and one or more processors (e.g., 912) coupled to the one or more memories, the one or more processors configured to cause the apparatus to perform one or more methods, operations or portions thereof described herein.

An apparatus comprising means (e.g., 910) adapted for performing one or more methods, operations or portions thereof described herein.

A processor (e.g., 912) comprising modules for carrying out one or more methods, operations or portions thereof described herein.

A hardware apparatus comprising circuits (e.g., 910) configured to perform one or more methods, operations or portions thereof described herein.

An apparatus comprising means (e.g., 910) adapted for performing one or more methods, operations or portions thereof described herein.

An apparatus comprising components (e.g., 910) operable to carry out one or more methods, operations or portions thereof described herein.

A computer-readable storage medium (e.g., 920, one or more internal, external or remote memories, or one or more registers) comprising instructions stored therein, the instructions comprising code for performing one or more methods or operations described herein.

A computer-readable storage medium (e.g., 920, one or more internal, external or remote memories, or one or more registers) storing instructions that, when executed by one or more processors, cause one or more processors to perform one or more methods, operations or portions thereof described herein.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the subject technology. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B. or only C; any combination of A. B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

Therefore, the subject technology is well adapted to attain the ends and advantages mentioned as well as those that are inherent therein. The particular embodiments disclosed above are illustrative only, as the subject technology may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the subject technology. The subject technology illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form. "from about a to about b," or, equivalently, "from approximately a to b," or, equivalently. "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A computer-implemented method, comprising:
   obtaining a first reflection signal at a first sensor device arranged at a first location in a conduit, wherein obtaining a first reflection signal comprises:
      actuating closure of a valve arranged in the conduit;
      generating a pressure pulse in response to the actuated closure of the valve;
      extracting a closure profile of the valve; and
      obtaining one or more characteristics of the pressure pulse from the extracted closure profile of the valve;
   determining a representation of a first deposition estimation in the conduit from the obtained first reflection signal and the one or more characteristics of the pressure pulse;
   obtaining a second reflection signal at a second sensor device arranged at a second location in the conduit;
   determining a representation of a second deposition estimation in the conduit from the obtained second reflection signal;
   determining an overlap estimation between the representation of the first deposition estimation and the representation of the second deposition estimation; and
   generating a representation of a deposition in the conduit from the determined overlap estimation.

2. The computer-implemented method of claim 1, further comprising:
   deploying the first sensor device into the conduit, wherein the first location is between a first end of the conduit and the deposition,
   wherein the valve is mechanically coupled to the first end of the conduit.

3. The computer-implemented method of claim 2, further comprising:
   deploying the second sensor device into the conduit, wherein the second location is between the deposition and a second end of the conduit that is opposite of the first end.

4. The computer-implemented method of claim 1, wherein the first reflection signal is based on the pressure pulse being reflected acoustically from the deposition to the first sensor device in a first direction, and wherein the second reflection signal is based on the pressure pulse being reflected acoustically from the deposition to the second sensor device in a second direction different from the first direction.

5. The computer-implemented method of claim 1, wherein determining the representation of the first deposition estimation comprises:
   determining a first pressure profile from the first sensor device using the first reflection signal;
   obtaining one or more parameters of the conduit; and
   computing the first deposition estimation with one or more of the first pressure profile, the one or more characteristics of the pressure pulse, or the one or more parameters of the conduit.

6. The computer-implemented method of claim 1, wherein determining the representation of the second deposition estimation comprises:
   determining a second pressure profile from the second sensor device using the second reflection signal;
   extracting a closure profile of the valve;
   obtaining one or more characteristics of the pressure pulse from the extracted closure profile of the valve;

obtaining one or more parameters of the conduit; and computing the second deposition estimation with one or more of the second pressure profile, the one or more characteristics of the pressure pulse, or the one or more parameters of the conduit.

7. The computer-implemented method of claim 1, further comprising:

determining a length scale estimation of the deposition, the length scale estimation indicating by how much a length of the deposition is scaled relative to the representation of the first deposition estimation.

8. The computer-implemented method of claim 7, wherein generating the representation of the deposition in the conduit comprises:

obtaining the length scale estimation of the deposition associated with one or more prior deposition estimations; and applying the length scale estimation to a prior deposition estimation associated with the first sensor device.

9. The computer-implemented method of claim 1, wherein determining the representation of the first deposition estimation comprises determining a first Gaussian distribution of the first deposition estimation, wherein determining the representation of the second deposition estimation comprises determining a second Gaussian distribution of the second deposition estimation, and wherein determining the overlap estimation comprises determining a length of an overlap region between the first Gaussian distribution and the second Gaussian distribution.

10. The computer-implemented method of claim 1, wherein the representation of the deposition in the conduit indicates a location of the deposition within the conduit and a thickness of the deposition.

11. A non-transitory computer-readable storage medium including instructions that, when executed by a processor, cause the processor to perform a method, the method comprising:

generating a pressure pulse in a conduit using a valve arranged in the conduit;

extracting a closure profile of the valve;

obtaining one or more characteristics of the pressure pulse from the extracted closure profile of the valve generating a first pressure profile based on the pressure pulse with a first transducer arranged at a first location in a conduit;

determining a first deposition estimation in the conduit from the first pressure profile;

generating a second pressure profile based on the pressure pulse with a second transducer arranged at a second location in the conduit;

determining a second deposition estimation in the conduit from the second pressure profile;

determining an overlap estimation between the first deposition estimation and the second deposition estimation;

generating a representation of a deposition in the conduit from the determined overlap estimation; and facilitating a conduit operation with the generated representation of the actual deposition in the conduit.

12. The non-transitory computer-readable storage medium of claim 11, wherein generating the first pressure profile comprises receiving a first reflection signal, wherein the first reflection signal is based on the pressure pulse being reflected acoustically from the deposition to the first transducer in a first direction, wherein generating the second pressure profile comprises receiving a second reflection signal, and wherein the second reflection signal is based on the pressure pulse being reflected acoustically from the deposition to the second transducer in a second direction different from the first direction.

13. The non-transitory computer-readable storage medium of claim 12, wherein determining the first deposition estimation comprises:

determining a first pressure profile from the first transducer using the first reflection signal;

obtaining one or more parameters of the conduit; and computing the first deposition estimation with one or more of the first pressure profile, the one or more characteristics of the pressure pulse, or the one or more parameters of the conduit.

14. The non-transitory computer-readable storage medium of claim 12, wherein determining the second deposition estimation comprises:

determining a second pressure profile from the second transducer using the second reflection signal;

extracting a closure profile of the valve;

obtaining one or more characteristics of the pressure pulse from the extracted closure profile of the valve;

obtaining one or more parameters of the conduit; and computing the second deposition estimation with one or more of the second pressure profile, the one or more characteristics of the pressure pulse, or the one or more parameters of the conduit.

15. The non-transitory computer-readable storage medium of claim 11, further comprising:

determining a length scale estimation of the deposition, the length scale estimation indicating by how much a length of the deposition is scaled relative to the first deposition estimation.

16. The non-transitory computer-readable storage medium of claim 15, wherein generating the representation of the deposition in the conduit comprises:

obtaining the length scale estimation of the deposition associated with one or more prior deposition estimations; and applying the length scale estimation to a prior deposition estimation associated with the first transducer.

17. The non-transitory computer-readable storage medium of claim 11, wherein determining the representation of the first deposition estimation comprises determining a first Gaussian distribution of the first deposition estimation, wherein determining the representation of the second deposition estimation comprises determining a second Gaussian distribution of the second deposition estimation, and wherein determining the overlap estimation comprises determining a length of an overlap region between the first Gaussian distribution and the second Gaussian distribution.

18. The non-transitory computer-readable storage medium of claim 11, wherein the representation of the deposition in the conduit indicates a location of the deposition within the conduit and a thickness of the deposition.

19. A system comprising:

a conduit comprising a first transducer and a second transducer;

one or more processors; and a non-transitory computer-readable medium operably coupled to the conduit to receive acoustic signals through the conduit and encoded with instructions that, when executed by the one or more processors, cause the one or more processors to perform operations comprising:

deploying the conduit into a wellbore penetrating one or more subterranean formations, the conduit coupled to a computing subsystem positioned on a surface;

actuating closure of a valve coupled to the conduit in response to fluid flow through the conduit, the valve being configured to generate an acoustic signal for transmission through fluid in the conduit in response to the actuated closure of the valve, wherein the first transducer and the second transducer are interposed between opposite ends of the conduit for measuring deposition buildup in the wellbore from one or more reflection signals based on the generated acoustic signal;

extracting a closure profile of the valve;

obtaining pressure measurements from the first transducer and the second transducer;

processing the pressure measurements and the closure profile of the valve with the computing sub system;

generating a representation of the deposition buildup in the wellbore based on an overlap estimation from the processed pressure measurements, the representation of the deposition buildup indicating a location of the deposition buildup within the wellbore and a thickness of the deposition buildup; and facilitating downhole operations in the wellbore based on the generated representation of the deposition buildup.

* * * * *